United States Patent Office 3,527,245
Patented Sept. 8, 1970

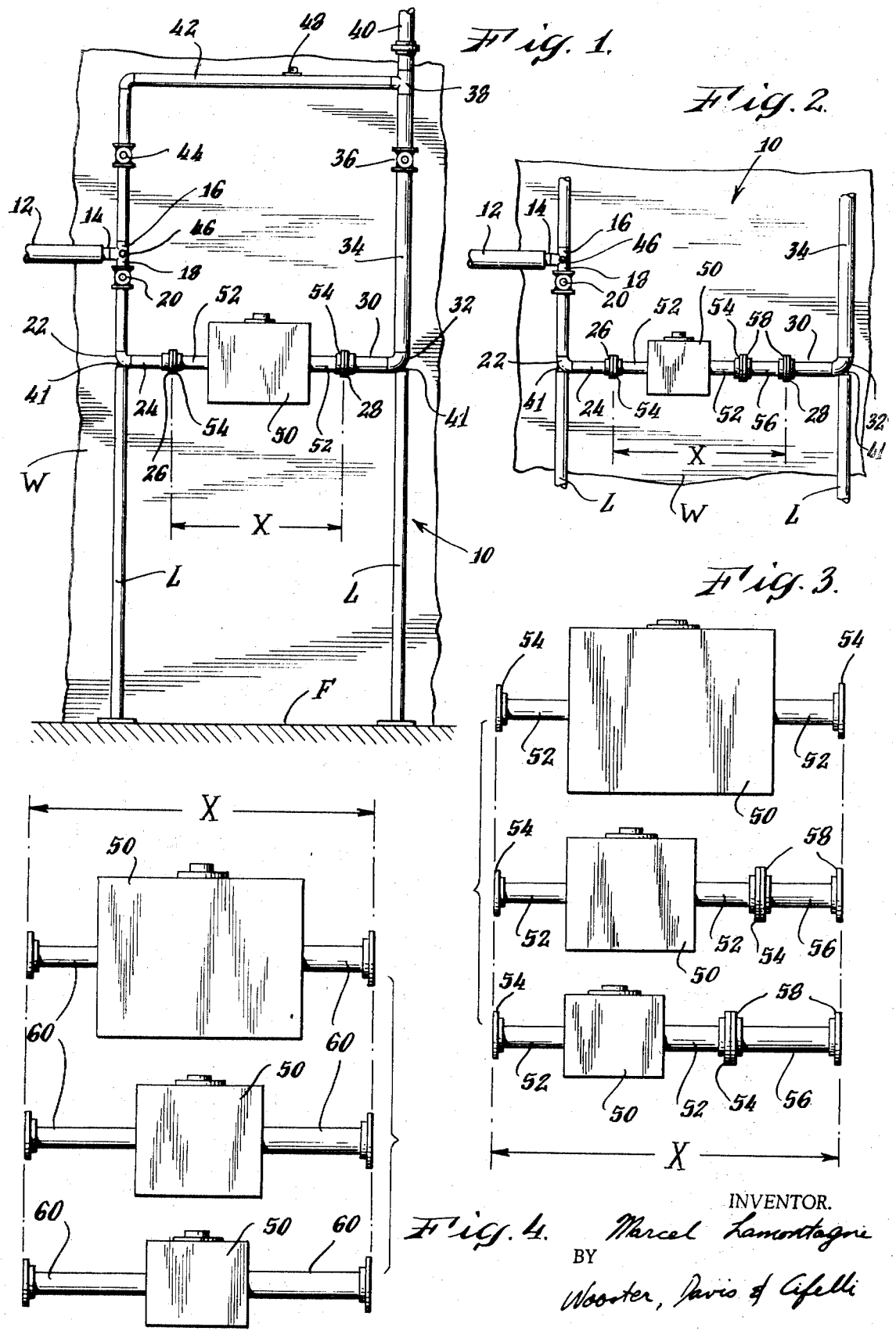

3,527,245
UNIVERSAL GAS METER INSTALLATION
Marcel Lamontagne, 59 S. View St.,
Waterbury, Conn. 06706
Filed Feb. 15, 1968, Ser. No. 705,711
Int. Cl. F17d 1/00; F16k 31/12
U.S. Cl. 137—269                                         4 Claims

ABSTRACT OF THE DISCLOSURE

A universal piping installation for accepting gas meters of various sizes having an inlet T, an outlet T and having two parallel flow paths connected therebetween. One of the flow paths includes spaced, aligned coupling members positioned a fixed distance apart to accept gas meters of various sizes having connecting piping secured thereto being selected to extend from one coupling member to the other. The other flow path is a meter bypass.

BACKGROUND OF THE INVENTION

This invention relates to a gas meter installation and, more particularly, to a universal installation which will accept gas meters of various sizes.

In a conventional fuel gas system the utility company brings a service line to the subscriber and installs a gas meter between the service line and the internal fuel line which supplies the subcriber's equipment. In residential applications, the utility company is able to accurately estimate the rate of fuel usage and will determine the size of meter to be permanently installed. If it should become necessary to exchange the gas meter for a larger size due to substantially increased usage the inconvenience of interrupted service may usually be borne with a minimum of discomfiture. However, certain problems arise in industrial and commercial applications where the quantity of fuel gas used by a single subscriber may vary appreciably. Thus, a successful and growing concern may increase its fuel consumption by utilizing its machinery longer hours and eventually around-the-clock. Periodically, the utility company must increase the size of the gas meter. If, on the other hand, the rate of fuel flow decreases a smaller gas meter must be installed. This is necessary because the usual gas meters are considered to be accurate only within certain limits. Therefore, as the gas meter must be changed with increased or decreased loads, the utility may conceivably have to change the gas meter several times in a given system. This is generally a time-consuming operation requiring re-piping in the area of the meter because the gas meters, as well as being rated for different flow rates, are made in various sizes. The installer usually brings to the job a length of pipe which must be cut to size and threaded on the job after the installer has determined what he needs to fabricate the proper installation. It should be noted that while the installer is working, the service must be turned off, resulting in the major problem encountered in the prior art installation of a different size gas meter, viz, the "down time" of the subscriber's equipment.

SUMMARY OF THE INVENTION

Accordingly, it is the primary object of my invention to provide a universal, prefabricated, gas meter installation, including a system of standardized flanged connecting pipes, which will accept gas meters of different sizes and will allow their installation without interruption of fuel service.

Another object of my invention is to provide a prefabricated gas meter installation which is portable and may be easily moved by a subscriber if he should relocate his place of business.

To achieve the objects of my invention, in one form I have provided a universal piping installation for accepting various sizes of fluid flow meters comprising: inlet means, outlet means; piping defining a fluid meter path between the inlet and outlet means including spaced aligned coupling members positioned a given distance apart to which may be secured meter coupling members connected to a fluid flow meter; piping defining a meter bypass path between the inlet and outlet means, and valve means disposed in the piping defining the fluid meter path and the bypass piping, whereby fluid may be selectively channeled to one of the paths.

BRIEF DESCRIPTION OF THE DRAWING

FIG. 1 is a front elvational view of a universal gas meter installation constructed in accordance with my invention;

FIG. 2 is a partial front elevational view similar to the gas meter installation of FIG. 1 showing one manner in which a smaller gas meter may be positioned;

FIG. 3 is a series of views showing one manner in which various sizes of gas meters may be positioned in my unique installation; and FIG. 4 is a series of views showing an alternate manner in which the various sizes of gas meters may be positioned in my unique installation.

DESCRIPTION OF THE PREFERRED EMBODIMENTS

Turning now to the drawing, there is illustrated in FIG. 1 a prefabricated piping installation generally designated by the numeral 10 which may be mounted upon the wall W while being supported above the floor F upon suitable legs L. A service line 12 is brought to the installation and is there threadedly engaged with a service inlet pipe 14 secured to an inlet T 16. I have provided an inlet T which may be turned 180° so that it may be secured to the service line 12 regardless of which side of the installation 10 the service line enters.

The lower arm 18 of the inlet T feeds the gas meter path of the installation which includes a suitable valve 20, for example, a butterfly wafer valve, an L 22, and a length of pipe 24 terminating in a first flanged coupling member 26. Spaced from the flanged coupling member 26 is a second flanged coupling member 28 which has been located a specific distance from the first flanged coupling 26. This distance has been represented in the drawing by the letter X. The second flanged coupling member 28 is mounted upon the end of a short length of pipe 30 which in turn is connected to a second L 32. A vertical pipe 34 is connected between the second L 32 and a valve 36, and an outlet T 38 secured to the valve 36 forms the end of the gas meter path feeding to a fuel line 40. Coupling blocks 41 are mounted upon the L's 22 and 32 being positioned to seat upon the legs L for supporting the installation.

The upper arm of the inlet T 16 feeds the bypass line 42 which is connected in parallel with the gas meter path between the two T's 16 and 38. A suitable valve 44 is provided in the bypass line. Further, I have provided plug members 46 and 48 which are received in suitable tapped openings provided therefore, which may be used for the taking of temperature and pressure measurements. The valves 20, 36 and 44 may be bolted to flanges as illustrated for interchangeability. Throughout my installation I have secured the piping and flanges together by welds for insuring the permanence of the construction. However, the piping may merely be threadedly connected if desired.

In FIGS. 1-3 there is illustrated one method of positioning a gas meter 50 in my unique prefabricated installation. I make use of the standard connecting pipes 52 extending from the various sizes of gas meters. Thus, I have chosen the distance X between the first and the second flanged coupling members 26 and 28 to be the same as the distance between flanges 54 located at the ends of the connecting pipes 52 of the largest gas meter. With regard to the smaller size meters as shown in FIGS. 2 and 3 I have provided a series of spool pieces 56 having flanged coupling members 58 at their ends which may be inserted between the standard gas meter connecting pipes and the first and second flanged coupling members 26 and 28.

In FIG. 4 I have illustrated a modified form of my invention which enables the gas meter 50 to be inserted directly between the flanged coupling members 26 and 28. To this end I have provided a system of connecting pipes 60 which may be substituted for the standard gas meter connecting pipes 52. Each pair of connecting pipes 60 terminates in a pair of meter flanges set at the distance X apart so that the gas meter 50 may be inserted between the flanged coupling members 26 and 28.

When it becomes necessary to change a gas meter 50 from one size to another the valve 44 in the bypass line 42 must first be opened and then valves 20 and 36 in the gas meter path closed to allow fuel to be supplied to the subscriber's equipment. As all the parts I have provided to substitute one meter for another are made exactly to the proper size and are provided to the subscriber as a package, it is an extremely simple and quick operation for the installer to loosen the bolts of the flanges 26 and 28, remove one gas meter, and install another with either the proper spool piece 56 attached thereto or one with the connecting pipe carrying the flanged couplings a distance of X inches apart. Once the gas meter has been bolted in place valves 20 and 36 must first be opened and then bypass valve 44 is then closed and sealed by the utility company.

I have found that my unique universal gas meter installation is extremely efficient and will reduce gas leaks which are caused by the improper installation of the gas meter by the prior art method. In my installation, all the piping is standardized and may be preformed on suitable machinery adapted for this purpose as opposed to the on-the-job cut-to-length pipes of the present day method. This is a practical installation from the point of view of the subscriber, since it eliminates "down time" of his equipment, fuel being supplied at all times during the change over without interruption. Furthermore, this installation is portable and may be moved by the customer as he relocates his place of business, or may be stored for future use.

What is claimed is:

1. A universal piping installation for accepting fluid flow meters of various sizes comprising: inlet means; outlet means; piping defining a fluid meter path between said inlet means and said outlet means including spaced, aligned coupling members positioned a fixed standard distance apart; a plurality of fluid flow meters of different sizes, each of said meters including meter coupling members spaced said fixed standard distance apart, said meters being selectively insertable into said fluid meter path with said meter coupling members connected to said piping coupling members; piping defining a meter bypass between said inlet means and said outlet means; and valve means disposed in said piping defining a fluid meter path and said bypass piping whereby fluid may be selectively channeled to one of the paths.

2. The universal piping installation defined in claim 1, wherein said inlet means and said outlet means are T's, and said inlet T is rotatable for accepting a supply line from one of several directions.

3. The universal piping installation defined in claim 1 wherein said coupling members are flanges.

4. The installation of claim 1 wherein: said meter coupling members comprise spool pieces having coupling members at their ends and connectable between the selected meter and one of said aligned coupling members.

References Cited

UNITED STATES PATENTS

| | | | |
|---|---|---|---|
| 1,107,532 | 8/1914 | Lofton | 285—31 XR |
| 1,053,528 | 2/1913 | Mueller et al. | 285—31 |
| 1,301,243 | 4/1919 | Ford | 285—32 |
| 2,895,496 | 7/1959 | Sanctuary | 137—599.1 XR |
| 3,288,494 | 11/1966 | Callahan et al. | 285—31 XR |

HENRY T. KLINKSIEK, Primary Examiner

U.S. CL. X.R.

285—31; 137—599.1